G. W. ALEXANDER.
Door Securer.

No. 201,586. Patented March 26, 1878.

Witnesses:
Thos. Mungen
John O'Donoghue.

Inventor:
G. W. Alexander,
By H. J. Ennis,
Atty.

UNITED STATES PATENT OFFICE.

GEORGE W. ALEXANDER, OF WASHINGTON, DISTRICT OF COLUMBIA.

IMPROVEMENT IN DOOR-SECURERS.

Specification forming part of Letters Patent No. 201,586, dated March 26, 1878; application filed February 12, 1878.

*To all whom it may concern:*

Be it known that I, GEORGE W. ALEXANDER, of Washington city, in the District of Columbia, have invented certain new and useful Improvements in Door-Fasteners; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1:
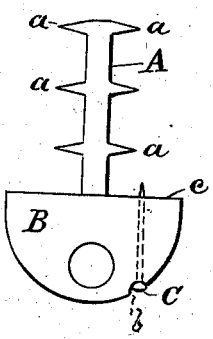
Figure 2:
Figure 3:
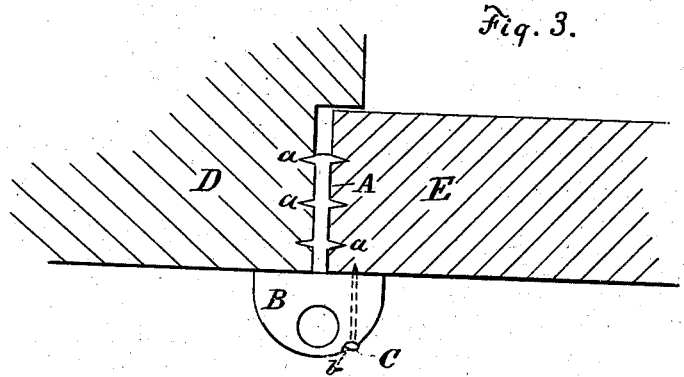

Figure 1 is a plan view of the invention; and Fig. 2, an end view, showing the teeth *a*. Fig. 3 shows the device in operation.

D is a door-frame; E, the door.

This invention relates to improvements in portable door-fastening devices, especially designed for the use of travelers and others, for securing doors and windows; and consists in the improved construction of the same, in connection with the locking-pin C, hereinafter more fully described, and particularly set out in the claim.

In the drawing, A represents the shank of the fastener, which is provided with six prongs or teeth, *a*, placed on opposite sides of the shank A. The said shank A is further provided with a flat semicircular handle, B, having an opening for convenience of attaching it to a key-ring, if desired.

The handle B is further provided with a hole, *b*, on one side of the key-ring opening. Said hole runs in a direction parallel to the shank A, the object of this being to contain the pin C.

The shoulders of the handle B are about twice the length of the prongs or teeth *a*, and are at a right angle to the shank A.

The handle B, shank A, and prongs *a* are designed to be made in one piece of malleable iron, or, preferably, drop-forged from cast-steel.

The operation of the device is as follows: The handle B being in the hand, the shank A is forced between the door and the frame, the teeth being in a line parallel to the opening between the door and frame. The shank A is forced in until the shoulder *c* is hard up against the door. It is then turned at a right angle to its former position. The prongs or teeth *a* then enter the wood on either side, and the shoulder projecting on each side of the door and frame. The pin C is then pushed in, thus firmly locking the device, and thereby effectually securing the door.

To unfasten the door, it is only necessary to withdraw the pin C, turn the handle B to its first position, and withdraw the fastener.

I am aware that door-fasteners having a square shoulder and bits on either side of the shank have been used, and I do not desire to lay broad claim thereto; but

What I claim as new and useful, and desire to secure by Letters Patent, is—

A door-fastener consisting of the shank A, provided with the teeth or prongs *a* on opposite sides thereof, and having the handle B, provided with the right-angular shoulders *c*, and the detachable fastening-pin C, adapted to be driven into the face of the door, substantially as described, and for the purpose set forth.

In testimony that I claim the foregoing as my own I affix my signature in presence of two witnesses.

GEORGE WASHINGTON ALEXANDER.

Witnesses:
 THEODORE MUNGEN,
 JOHN O'DONNOGHUE.